US011780180B2

(12) United States Patent
Schlegel et al.

(10) Patent No.: US 11,780,180 B2
(45) Date of Patent: *Oct. 10, 2023

(54) FIBER COMPOSITE LAYING DEVICE AND FIBER COMPOSITE LAYING METHOD FOR PRODUCING A FIBER COMPOSITE SCRIM FOR FORMING A FIBER COMPOSITE COMPONENT

(71) Applicants: Airbus Defence and Space GmbH, Taufkirchen (DE); Airbus Operations, S.L., Madrid (ES)

(72) Inventors: Katharina Schlegel, Taufkirchen (DE); Alois Friedberger, Taufkirchen (DE); David Lopez-Bravo, Getafe (ES)

(73) Assignees: Airbus Defence and Space GmbH, Taufkirchen (DE); Airbus Operations, S.L., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,652

(22) Filed: Oct. 19, 2021

(65) Prior Publication Data
US 2022/0032561 A1 Feb. 3, 2022

Related U.S. Application Data

(62) Division of application No. 16/033,300, filed on Jul. 12, 2018, now Pat. No. 11,426,953.

(30) Foreign Application Priority Data

Jul. 14, 2017 (DE) ..................... 10 2017 212 068.1

(51) Int. Cl.
*B29C 70/38* (2006.01)
*B29C 70/34* (2006.01)
(Continued)

(52) U.S. Cl.
CPC ............ *B29C 70/384* (2013.01); *B29C 70/34* (2013.01); *B29C 70/388* (2013.01);
(Continued)

(58) Field of Classification Search
CPC ..... B29C 70/386; B29C 70/34; B29C 70/388; B29C 70/504
See application file for complete search history.

(56) References Cited

U.S. PATENT DOCUMENTS

| 4,750,965 A | 6/1988 | Pippel et al. |
| 4,997,510 A | 3/1991 | Shinno et al. |

(Continued)

FOREIGN PATENT DOCUMENTS

| DE | 10 2007 009 124 A1 | 8/2008 |
| DE | 10 2013 111 582 A1 | 4/2015 |

(Continued)

OTHER PUBLICATIONS

German Search Report for German Application No. 102017212068.1 dated Nov. 23, 2017.

(Continued)

*Primary Examiner* — Matthew J Daniels
(74) *Attorney, Agent, or Firm* — KDW Firm PLLC

(57) ABSTRACT

A fiber composite laying method for producing a fiber composite scrim for forming a fiber composite component. The method includes supplying a reinforcement fiber band to a laying head, laying and compacting the supplied reinforcement fiber band on a laying surface at an average compaction pressure by a compaction roller, and detecting a local compaction pressure on the laid reinforcement fiber band by pressure sensors on the compaction roller.

16 Claims, 1 Drawing Sheet

(51) Int. Cl.
  *B29C 70/50* (2006.01)
  *B29C 37/00* (2006.01)
  *B29K 105/08* (2006.01)

(52) U.S. Cl.
  CPC ...... *B29C 70/504* (2013.01); *B29C 2037/903* (2013.01); *B29K 2105/0872* (2013.01)

(56) References Cited

U.S. PATENT DOCUMENTS

| | | | | |
|---|---|---|---|---|
| 5,011,563 | A | * | 4/1991 | Shinno .................. B29C 70/388 156/523 |
| 5,074,948 | A | * | 12/1991 | Greffioz ................ B29C 70/388 156/523 |
| 7,039,485 | B2 | | 5/2006 | Engelbart et al. |
| 8,475,347 | B2 | * | 7/2013 | Gustafson ................ D21F 3/08 73/862.55 |
| 2005/0261115 | A1 | | 11/2005 | Moore et al. |
| 2014/0190629 | A1 | | 7/2014 | Benson et al. |
| 2015/0343713 | A1 | | 12/2015 | Engel |
| 2016/0114536 | A1 | * | 4/2016 | Engel .................. G01N 21/8806 156/379 |
| 2017/0001384 | A1 | | 1/2017 | Eitzinger et al. |
| 2019/0016066 | A1 | | 1/2019 | Schlegel et al. |

FOREIGN PATENT DOCUMENTS

| | | |
|---|---|---|
| DE | 10 2014 102 278 A1 | 8/2015 |
| DE | 10 2015 008 313 A1 | 1/2017 |
| DE | 10 2015 215 936 A1 | 2/2017 |
| EP | 2 036 702 B1 | 3/2009 |
| EP | 2 639 048 A1 | 9/2013 |

OTHER PUBLICATIONS

British Search Report for Great Britain Application No. GB1807298.3 dated Oct. 26, 2018.
German Office Action for Application No. 10 2017 212 068.1 dated Jun. 25, 2019.
Restriction Requirement for U.S. Appl. No. 16/033,300 dated Jul. 1, 2021.
Non-Final Office Action for U.S. Appl. No. 16/033,300 dated Nov. 29, 2021.

* cited by examiner

FIBER COMPOSITE LAYING DEVICE AND FIBER COMPOSITE LAYING METHOD FOR PRODUCING A FIBER COMPOSITE SCRIM FOR FORMING A FIBER COMPOSITE COMPONENT

CROSS-REFERENCE TO RELATED APPLICATIONS

This application is a divisional of U.S. patent application Ser. No. 16/033,300 filed Jul. 12, 2018, and which claims priority to German patent application DE 10 2017 212 068.1 filed Jul. 14, 2017, the entire disclosures of which are incorporated by reference herein.

TECHNICAL FIELD

The disclosure herein relates to a fiber composite laying device for producing a fiber composite scrim for forming a fiber composite component, and to a fiber composite laying method for a fiber composite laying device of this kind.

Although the disclosure herein can be used to produce a wide range of fiber composite scrims and fiber composite components in various applications, the disclosure herein and the problems on which it is based are described in greater detail in relation to the production of aircraft structures. However, the described method and devices may also be used in all fields of the transport industry, for example for motorised road vehicles, rail vehicles, aircraft or watercraft, but also in general in engineering and mechanical engineering.

BACKGROUND

In modern aircraft construction, supporting or structurally reinforcing components are increasingly being made of fiber composite materials such as carbon-fiber-reinforced plastics material (CFRP). Producing structural components of this kind having large dimensions, such as stringers, formers or the like, from composite materials can be a challenge in view of the complex geometries. Fully automated manufacturing processes for composite components of this kind, such as automated fiber placement (AFP) or automated tape laying (ATL), are widely used. In the processes, reinforcement fibers are laid as bands, with or without a material matrix, for example a synthetic resin, along a predetermined path on a tool surface using pressure and heat, by a laying head which may be robotically guided. A device of this type is disclosed for example in EP 2 036 702 B1. Typically, a laying head of this type comprises a compaction roller, by which the fibers or fiber composite bands are unrolled continuously onto a laying surface whilst applying pressure and heat, and optionally cut to length at predetermined end points using a cutting tool. The fiber composite bands may be laid in the laying surface so as to be straight or curved, the fibers or bands being oriented by the pressure of the compaction roller and the material tension.

In typical methods, the quality of the continuously shaped fiber composite scrim or fiber composite component is improved by the laying method being repeatedly interrupted from time to time for an intermediate compaction. For example, air inclusions in a scrim can be prevented by the completely draped layers being packed into a vacuum bag and drawn into their correct shape under pressure. Advanced methods further provide for a contact pressure of the compaction roller to be measured and/or adjusted; see e.g. DE 10 2015 215 936 A1. For the purpose of quality assurance, an optical detector system arranged on the laying head is sometimes proposed, which system detects any laying errors in a contactless manner or checks that the predetermined requirements are satisfied. DE 10 2015 008 313 A1 thus discloses a laying roller which comprises a radiation source and/or at least one sensor and is, at least in regions, transparent to radiation emitted by a radiation source.

SUMMARY

Against this background, it is an idea of the disclosure herein to find improved solutions for automatically laying reinforcement fibers.

A fiber composite laying device for producing a fiber composite scrim for forming a fiber composite component is thus provided. The fiber composite laying device comprises a laying head which is designed or configured to continuously supply a reinforcement fiber band. The fiber composite laying device further comprises a compaction roller which is designed or configured to receive the supplied reinforcement fiber band, lay the band on a laying surface and press the band onto the laying surface at an average compaction pressure. The fiber composite laying device further comprises a plurality of pressure sensors which are arranged on the compaction roller and are designed or configured to detect a local compaction pressure on the laid reinforcement fiber band.

A fiber composite laying method for producing a fiber composite scrim for forming a fiber composite component is further provided. The fiber composite laying method comprises supplying a reinforcement fiber band to a laying head. The fiber composite laying method further comprises laying and compacting the supplied reinforcement fiber band on a laying surface at an average compaction pressure by a compaction roller. The fiber composite laying method further comprises detecting a local compaction pressure on the laid reinforcement fiber band by a plurality of pressure sensors on the compaction roller.

A concept underlying the disclosure herein consists of or comprises locally measuring the compaction pressure, i.e. the contact pressure on the reinforcement fiber band and the laying surface, in order to obtain more precise information about the compaction, in particular about the current behaviour of the pressurized reinforcement fiber band. For this purpose, the local compaction pressure can be detected in particular continuously and in real time. For example, an inhomogeneous and/or anisotropic pressure distribution can occur in the reinforcement fiber band, since the surface of the fibers or of the reinforcement fiber band is typically not completely flat under realistic conditions. In addition, air inclusions or material properties such as porosity, etc., may influence the pressure distribution. In such cases, locally detecting the compaction pressure gives the option of monitoring the pressure conditions in real time and thus anticipating and/or preventing laying errors and/or laying inaccuracies. In addition, the detected data may be compiled and evaluated in order to develop optimisation options for the automated manufacture of fiber composite components, for example by advanced digital analysis methods. Since compaction is an important step in manufacturing fiber composite components, compaction that is as precise as possible is a key feature of a high-quality product. As a result, costs can ultimately be saved and the general manufacturing quality improved. For example, the disclosure herein makes it possible to prevent or at least significantly limit time-consuming and laborious intermediate compaction steps. In contrast to the disclosure herein, the compaction pressure in conventional methods is measured either not at all or only for installation and/or maintenance purposes. At best, it is known to detect and/or adjust the compaction pressure "globally" for the compaction roller per se. In contrast, however, the solution according to the disclosure herein provides for "local" detection of the compaction pressure. In principle, the disclosure herein provides a plurality of pressure sensors for this purpose. For example, in certain embodiments, even a small number of pressure sensors may suffice, for example less than 10. In principle, however, a very large number of pressure sensors may just as well be provided, for example 100 or more than 1000.

The fiber composite laying device can be integrated in an AFP device, an ATL device or the like, for example an AFP or ATL laying head. In principle, it is also conceivable to retrofit existing AFP or ATL devices by incorporating a correspondingly equipped compaction roller.

Reinforcement fiber bands can be planar bands or band-shaped arrangements of fibers which can optionally be embedded in an associated composite material, i.e. a matrix material. For example, a reinforcement fiber band within the meaning of the disclosure herein may be a prepreg, in other words a textile semi-finished product pre-impregnated with resin. Alternatively, however, the disclosure herein also provides reinforcement fiber bands having dry fibers (dry fiber placement), in which a composite material, for example a thermoplastic, integrated in the fibers is only subsequently liquefied under the effect of heat to connect the fibers. Reinforcement fiber bands according to the disclosure herein also include in particular strips, sheets, tows, tapes (which may in turn consist of one or more tows arranged side by side) or similar band-like arrangements of fibers. For example, the bands may be plastics bands which are penetrated by carbon fibers in a longitudinal direction. The fibers contained may be in the form of a pure unidirectional layer, but also in principle in the form of a woven fabric or scrim or the like.

According to one development, the compaction roller can be designed or configured to adjust the average compaction pressure on the basis of the detected local compaction pressure. Accordingly, the fiber composite laying method can comprise adjusting the average compaction pressure of the compaction roller on the basis of the detected local compaction pressure. In this development, precise knowledge of the local pressure ratios can thus be used to adjust the compaction pressure of the compaction roller accordingly. The compaction pressure can be increased, for example, if it is determined that the compaction pressure locally falls below a predetermined threshold, for example owing to air inclusions or similar effects.

According to one development, a plurality of actuators may be provided. The actuators can be arranged on the compaction roller and can be designed or configured to adjust the local compaction pressure on the basis of the detected local compaction pressure. Accordingly, the fiber composite laying method can comprise adjusting the local compaction pressure on the basis of the detected local compaction pressure by a plurality of actuators on the compaction roller. In this development, the compaction pressure is not only locally detected and optionally evaluated, but the pressure is additionally directly and immediately locally (re)adjusted in order to thus achieve optimum control via the current pressure ratios in the laid reinforcement fiber band. For example, a very fast (virtually instantaneous) control loop can be implemented so that an actuator can be activated depending on the results of the associated pressure sensor(s).

According to one development, at least some of the pressure sensors can be designed or configured to be actuators. Units made of sensors and actuators can thus be provided which combine as it were the properties of a pressure sensor and the properties of an actuator. For example, an element of this kind can be produced on the basis of piezoelectric transducers. In principle, it is also possible to integrate additional functions, for example heating.

According to one development, the pressure sensors can be designed or configured to be at least one sensor array along a compaction surface of the compaction roller. For example, a plurality of sensor arrays of this kind can be arranged around the compaction roller in the circumferential direction, for example each sensor array can be oriented in the longitudinal direction, i.e. in the direction of the axis of rotation, of the compaction roller and comprise a plurality of pressure sensors, for example 10, 100 or more pressure sensors. Arrays of pressure sensors can be produced using microtechnology methods. In this case, parallel processing methods can be used, as a result of which many sensors per unit area may be cost-effectively incorporated and controlled or read out, without resulting in a high data density. In addition, a very large number of pressure sensors has the advantage that, when a single sensor fails, the system does not need to be declared defective, but rather only the signals from the neighbouring sensors can be evaluated, without suffering significant losses in the quality of the pressure measurement.

According to one development, the pressure sensors can be designed or configured to substantially cover the entire compaction surface of the compaction roller. In principle, it is thus also provided to cover a large portion of the compaction surface or even virtually the entire compaction surface with pressure sensors and thus effectively achieve almost continuous detection of the local compaction pressure.

According to one development, the pressure sensors can have a pressure-sensitive flexible diaphragm. A diaphragm of this kind is deflected or bent under pressure, the deflection being relative to the amount of pressure. The deflection of the diaphragm can be measured electrically, for example, by piezo resistors or piezo sensors placed on and/or in the diaphragm, for example. The deflection can also be determined by measuring an electrical change in capacitance between the diaphragm and a corresponding electrode. For this purpose, the diaphragm or at least the surface of the diaphragm may be electrically conductive.

According to one development, the pressure sensors can be designed or configured to be piezoelectric elements. The pressure sensors can generally be manufactured from a material which has a pressure-dependent electrical resistance or another pressure-dependent characteristic.

According to one development, the pressure sensors can be embedded in a protective layer on the compaction roller. A protective layer of this kind may be made of PMMA (acrylic glass), for example. In an alternative embodiment, a protective layer for protection against contamination or corresponding materials known to a person skilled in the art may be manufactured from FEP (fluorinated ethylene propylene), it being possible to insert the pressure sensors into a protective layer of this kind. However, the pressure sensors can also be arranged in a film or the like, in particular a flexible substrate or a flexible plate which is applied around the compaction roller and thus forms the compaction surface. Accordingly, metal conductive tracks in the flexible substrate can provide the electrical connections between the pressure sensors or actuators and the additional electronic system of the fiber composite laying device, and therefore conventional wire connections or the like can be completely avoided. In one development, the compaction roller can be electrically coupled to a stationary portion of the fiber composite laying device via a slip ring arrangement or the like. Alternatively or additionally, a wireless data and/or energy connection can also be provided. For example, the electronic components of the flexible circuit board comprising the pressure sensors and/or actuators may be designed for wireless data communication. For example, individual pressure sensors and/or actuators can provide a passive or active wireless interface, for example passively as a piezo-electric transducer or sensor, via surface acoustic waves (SAW) or via Lamb waves as a flexural plate wave (FPW) sensor the like, or actively as an integrated antenna or similar device.

According to one development, the fiber composite laying device can further comprise a radiation source which is designed or configured to irradiate the laid reinforcement fiber band at least in regions. The fiber composite laying device can further comprise a radiation sensor which is designed or configured to detect reflection radiation reflected by the laid reinforcement fiber band. The fiber composite laying device can further comprise an evaluation unit which is designed or configured to evaluate the detected reflection radiation in order to establish laying errors. The compaction roller can be designed, at least in regions, to be transparent to radiation emitted by the radiation source. Accordingly, the fiber composite laying method can comprise irradiating the laid reinforcement fiber band, at least in regions, by a radiation source. The fiber composite laying method can further comprise detecting reflection radiation reflected by the laid reinforcement fiber band by a radiation sensor. The fiber composite laying method can further comprise evaluating the detected reflection radiation by an evaluation unit in order to establish laying errors. The radiation source can emit electromagnetic radiation in a wavelength range of between 200 nm and 1 mm and be designed as a light-emitting diode, laser diode or laser, for example. As a result, the surface of the laid reinforcement fiber bands can be sampled using radiation of which the wavelength is best suited for detecting laying errors. In this case, the wavelength of the radiation emitted by the radiation source is between far infrared and far ultraviolet. The at least one radiation source can emit radiation or light in a wavelength range that is visible to the human eye. In turn, the radiation sensor can be, for example, a corresponding camera for generating image data, which is designed or configured to record the corresponding radiation. Alternatively or additionally, a corresponding sensitive sensor array may be provided. When a laying error or the like occurs, signaling can thus be carried out by the evaluation unit and/or the laying of the reinforcement fiber bands can be interrupted, for example. As a result, a largely automatic evaluation and identification of laying errors is possible. The evaluation unit may be produced for example so as to have a digital computer, a PC, a FPGA, a microcontroller, a neural network implemented on a suitable hardware platform by a software algorithm, or the like. On the basis of the measurement data generated by the at least one radiation sensor, the evaluation unit detects any laying errors using suitable algorithms and displays the data online or offline in a manner suitable for a user. For example, both the radiation source and the radiation sensor can be integrated in the compaction roller, for example can be arranged inside the compaction roller. As a result, a fully automated detection of laying errors is possible as early as during the laying process, and therefore there is no need for a visual inspection, which would otherwise need to be carried out after laying a layer of reinforcement fiber bands. Owing to the direct integration of the measurement system consisting of the radiation source and the radiation sensor in the compaction roller, the movement space of the laying head is virtually unimpeded. In addition, owing to the immediate proximity of the measurement system to the current laying position, a considerable increase in quality can be achieved in the detection of laying errors. If the installation space inside the compaction roller is limited, the radiation sensor and/or the radiation source can be positioned outside the compaction roller. If the radiation source is arranged outside the compaction roller, the radiation can be coupled into the compaction roller by a radiation conductor, for example. Furthermore, the reflected radiation can also be coupled out of the compaction roller and supplied to a radiation sensor arranged outside the compaction roller by a radiation conductor.

According to one development, at least some of the pressure sensors can be designed or configured to be transparent to radiation emitted by the radiation source. For example, pressure sensors can comprise a pressure-sensitive flexible diaphragm, the deflection of which inside the compaction roller can be measured optically. Such a radiation-transparent design of the pressure sensors is in particular advantageous if a large number of pressure sensors covers a significant portion of the compaction surface. For example, a diaphragm of this kind can be manufactured from a transparent silicon or a polymer. Accordingly, transparent electrodes and metal layers can be used, for example based on conductive polymers or transparent semiconductors, for example indium tin oxide or similar materials, inter alia those known from photovoltaics. From the present teaching, a person skilled in the art would derive corresponding materials and measures as to how transparent sensor and/or actuator designs of this kind can be achieved.

The above-mentioned embodiments and developments can be combined in any manner, if appropriate. Further possible embodiments, developments and implementations of the disclosure herein include combinations of features of the disclosure herein described previously or below with respect to the embodiments, even if not explicitly specified. In particular, a person skilled in the art will also add individual aspects as improvements or supplements to the particular basic form of the disclosure herein.

BRIEF DESCRIPTION OF THE DRAWINGS

The disclosure herein will be described in greater detail below with reference to the example embodiments shown in the example, schematic drawings, in which.

The accompanying drawings are intended to facilitate further understanding of the embodiments of the disclosure herein. The drawings illustrate embodiments and, together with the description, are used to explain principles and concepts of the disclosure herein. Other embodiments and many of the advantages mentioned can be found with reference to the drawings. The elements of the drawings are not necessarily shown true to scale relative to one another.

In the figures of the drawings, identical, functionally identical and identically operating elements, features and components are in each case provided with the same reference signs, unless indicated otherwise.

DETAILED DESCRIPTION

Figure 1:
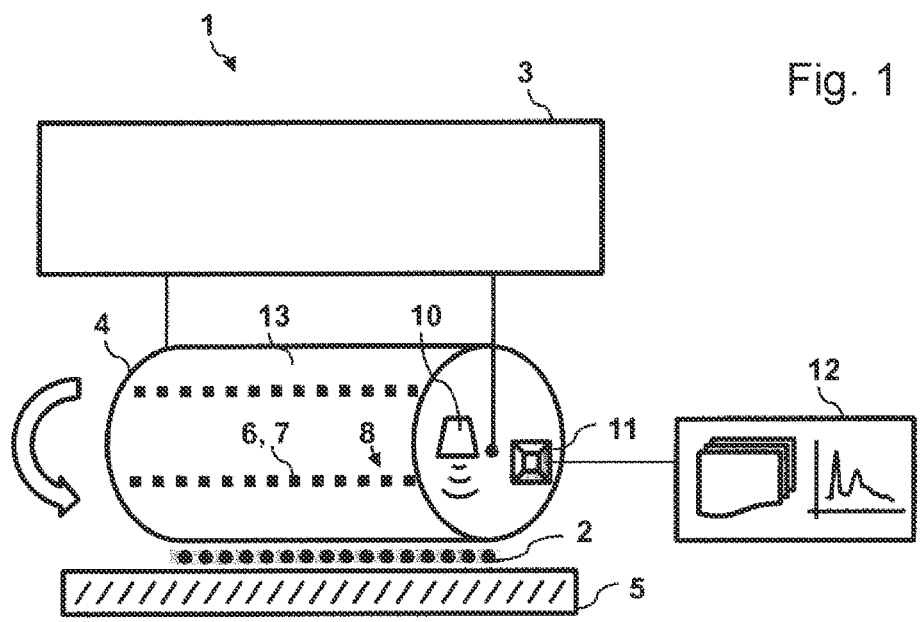
FIG. 1 is a schematic view of a fiber composite laying device comprising a compaction roller according to one embodiment of the disclosure herein.
Figure 2:
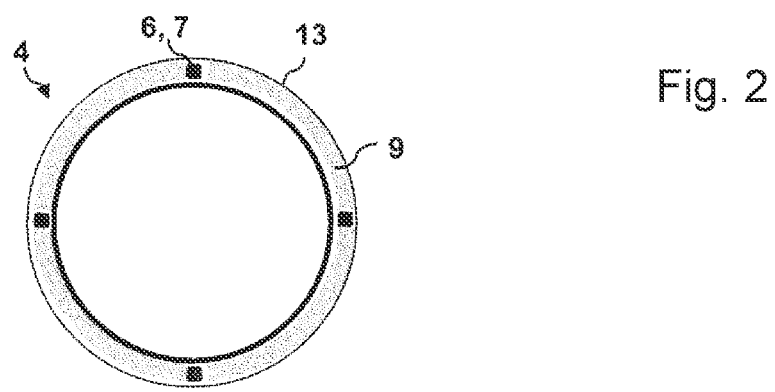
FIG. 2 is a schematic sectional view of the compaction roller from FIG. 1.
Figure 3:
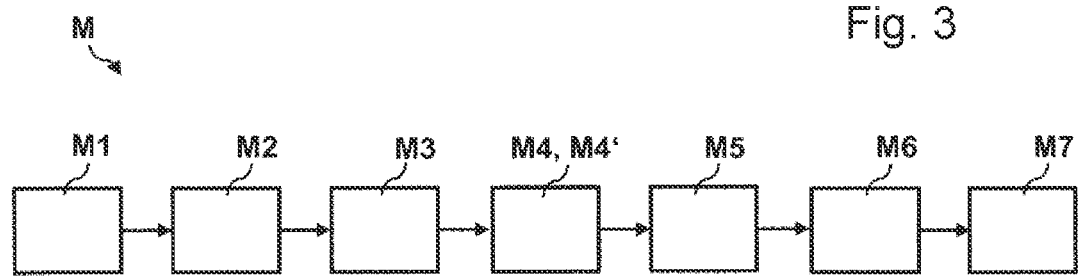
FIG. 3 shows a schematic flow chart of a fiber composite laying method for the fiber composite laying device from FIG. 1.

FIG. 1 is a schematic view of a fiber composite laying device 1 comprising a compaction roller 4 according to one embodiment of the disclosure herein. The compaction roller 4 is also shown in FIG. 2 in a schematic sectional view. A schematic flow chart of a corresponding fiber composite laying method M for the fiber composite laying device 1 from FIG. 1 is shown in FIG. 3.

The fiber composite laying device 1 is designed or configured to produce a fiber composite scrim for forming a fiber composite component. In FIG. 1, a single laid reinforcement fiber band 2 is shown merely schematically. It will be clear to a person skilled in the art that optionally more complex fiber composite scrims may also accordingly be formed by consecutively laying reinforcement fiber bands 2 of this kind, which, after a corresponding deformation and/or curing process, result in a fiber composite component. For this purpose, the fiber composite scrim can consist of or comprise a plurality of reinforcement fiber bands 2, which in turn may comprise a plurality of reinforcement fibers with or without matrix material. Carbon-fiber-reinforced bands or CFRP tows can be used as the reinforcement fiber bands 2. The reinforcement fiber bands 2 can be pre-impregnated dry or, at least in portions, with a suitable plastics material or corresponding matrix material. For example, the reinforcement fiber band 2 may be a fiber composite tow pre-impregnated with plastics resin and having a laying width of from several millimetres to centimetres, or the like. Laying reinforcement fiber bands of this kind can for example be a first method step in producing a three-dimensionally curved annular former or a straight stringer. Laying can be flat in a planar arrangement or can take place along a three-dimensional curved surface, for example.

For successive laying, in layers, of the reinforcement fiber bands 2 on a laying surface 5, the fiber composite laying device 1 comprises a laying head 3 which is designed or configured to continuously supply a reinforcement fiber band 2. The laying head 3 can be freely positioned in relation to the laying surface 5 by a handling apparatus (not shown), in particular a standard industrial robot having multiple degrees of freedom. The laying surface 5 may have a surface geometry which differs from the planar shape shown here merely by way of example, for example, any two-dimensionally curved surface geometry or a surface geometry which is curved in a convex or concave manner at least in regions. In principle, the laying head 3 can be moved spatially freely in relation to the laying surface 5 in an automated manner on any straight or curved tracks.

The compaction roller 4 is designed or configured to receive the supplied reinforcement fiber band 2, lay the band on the laying surface 5 and press the band onto the laying surface 5 at an average compaction pressure. In this case, an average compaction pressure is understood to mean that the compaction roller 4 is pressed onto the laying surface 5 or onto the reinforcement fiber band 2 or fiber composite scrim already laid on the laying surface 5 at a particular compaction pressure. In an idealised case of a perfectly planar reinforcement fiber band 2 and a perfectly planar laying surface 5, the compaction roller 4 would compact all of the pressed regions at the same specific compaction pressure. In a realistic case, however, all of the components have corresponding irregularities, and therefore only an average compaction pressure can be specified directly by the compaction roller 4. However, the compaction pressure can vary locally in the reinforcement fiber band 2 to a greater or lesser extent, for example owing to air inclusions in the already laid reinforcement fiber band 2 or other influences.

In order to take these local deviations into consideration, the fiber composite laying device 1 provides a plurality of pressure sensors 6 which are arranged on the compaction roller 4 and are designed or configured to detect the local compaction pressure on the laid reinforcement fiber band 2. This makes it possible to detect the specific pressure conditions in real time and thus to anticipate and/or to prevent laying errors and/or laying inaccuracies. The automated manufacture of fiber composite components can be improved by the data being compiled and evaluated and, building thereon, optimisation options being developed, i.e. being able to use advanced digital analysis methods in order to obtain an improved understanding of the laying process and thus ensuring increased quality control.

In this exemplary embodiment, the pressure sensors 6 are arranged in a plurality of sensor arrays 8 along a compaction surface 13 of the compaction roller 4. Each of these sensor arrays 8 comprises a plurality of pressure sensors 6 and is oriented in the longitudinal direction, i.e. in the direction of the axis of rotation, of the compaction roller (cf. the arrow in FIG. 1 which indicates the direction of rotation of the compaction roller). The pressure sensors 6 are embedded in the compaction surface 13 in a protective layer 9 of the compaction roller 4. Each pressure sensor 6 comprises a flexible pressure-sensitive diaphragm (not indicated), the deflection of which under pressure is determined by a piezoelectric element provided in each pressure sensor 6, from which in turn the local compaction pressure prevailing at this specific pressure sensor 6 can be deduced. In this advantageous embodiment of the disclosure herein, each pressure sensor 6 is further designed as an actuator 7, in order to be able to not only detect the local compaction pressure, but optionally also to immediately adjust the compaction pressure. This means that not only can the average compaction pressure of the compaction roller 4 be "globally" adjusted on the basis of the detected data, but rather the compaction pressure can also be modified locally and in a dedicated manner as required, in particular in real time. This introduces the additional significant advantage of the shown fiber composite laying device 1, whereby potential errors or inaccuracies in laying the reinforcement fiber band 2 are not only detected, but can be immediately counteracted in order to minimize the errors or inaccuracies as much as possible or even completely prevent them.

In the exemplary embodiment shown, the pressure sensors 6 are designed as actuators 7. However, it would be immediately clear to a person skilled in the art that separate sensor and actuator elements can also be provided on the compaction surface 13 of the compaction roller 4. The protective layer 9 may be made of acrylic glass or of a plastics material, for example. However, in a particularly advantageous embodiment, the protective layer may be provided in particular as a flexible circuit board which is applied around the compaction roller 4 and in which the pressure sensors 6 or actuators 7 are electrically integrated. A person skilled in the art will provide corresponding electrical connections between the individual components within the compaction surface 13 of the compaction roller 4, for example on the basis of printed conductor tracks or the like. In addition, depending on the application, the electronic components of the flexible circuit board comprising the pressure sensors 6 and/or actuators 7 may be designed for active or passive wireless data communication, for example as piezoelectric transducers or the like.

In the embodiment shown, the fiber composite laying device 1 further comprises a radiation source 10, a radiation sensor 11 and an evaluation unit 12 coupled to the radiation sensor 11 and/or the radiation source 10. The radiation source 10 is designed or configured to irradiate the laid reinforcement fiber band 2, at least in regions, with electromagnetic radiation having wavelengths in the visual spectrum. The radiation sensor 11 is designed, as an electronic camera, to detect reflection radiation reflected by the laid reinforcement fiber band 2, which radiation can occur as diffuse and/or direct reflection radiation of the irradiated radiation. The evaluation unit 12 is in turn designed or configured to evaluate the detected reflection radiation in order to establish laying errors. In this embodiment, the compaction roller 4 is designed so as to have an optically transparent material. In particular, the pressure sensors 6 or actuators 7 are also designed or configured to be optically transparent. For this purpose, the sensors or actuators, or the flexible protective layer 9, are manufactured completely or at least mostly from optically transparent materials. For this purpose, both the radiation sensor 11 and the radiation source 10 are arranged inside the compaction roller 4 in the region of the axis of rotation. In this case, the compaction surface 13 of the compaction roller 4 acts to a certain extent as a window, in order to convey the radiation from the radiation source 10 to the laid reinforcement fiber band 2 and to allow the reflected back radiation through, such that the back radiation can be received by the radiation sensor 11.

The radiation source 10 can be fitted with a light-emitting diode, a laser diode, a laser or another compact lighting. The radiation sensor 11 can be produced so as to have an electronic camera (CCD camera) or a two-dimensional sensor array, for example. The radiation source 10 and/or the radiation sensor 11 are actuated by the evaluation unit 12 via a cable or wirelessly. Exactly like the pressure sensors 6, the radiation sensor 11 generates measurement data which are supplied to the evaluation unit 12 for detailed evaluation and analysis. A data cable for the radiation sensor 11 is indicated merely by way of example, but the pressure sensors 6 can also be connected to the evaluation unit 12 via a cable and/or wirelessly. The evaluation unit 12 can thus also be designed or configured to detect and analyze the average compaction pressure and/or the local compaction pressure. The reflection radiation reflected by the reinforcement fiber band 2, in conjunction with the evaluation unit 12, allows very reliable and detailed detection and type differentiation of any occurring laying errors. For this purpose, a plurality of suitable analysis methods or algorithms are stored in the evaluation unit 12. The evaluation unit 12 can be implemented so as to have a universal, digital computing unit, in particular a PC, a pre-programmed FPGA, a microcontroller, a digitally simulated neural network or the like. If a laying error is detected, a corresponding notification can be given to a user, for example by an optical and/or acoustic signaling device(s) assigned to the evaluation unit 12, and/or the entire laying process can be automatically interrupted or completely stopped without needing additional external intervention. In principle, however, the average and/or local compaction pressure of the compaction roller 4 can alternatively or additionally be adjusted in order to immediately counteract corresponding defects.

The fiber composite laying method M in FIG. 3 correspondingly comprises the steps of: supplying the reinforcement fiber band 2 to the laying head 3 (M1); laying and compacting the supplied reinforcement fiber band 2 on the laying surface 5 at an average compaction pressure by the compaction roller 4 (M2); and detecting the local compaction pressure on the laid reinforcement fiber band 2 by the plurality of pressure sensors 6 on the compaction roller 4 (M3). The fiber composite laying method M further comprises adjusting the average compaction pressure of the compaction roller 4 on the basis of the detected local compaction pressure (M4) and/or adjusting the local compaction pressure by the plurality of actuators 7 on the compaction roller 4 on the basis of the detected local compaction pressure (M4'). The fiber composite laying method M further comprises, in steps M5 to M7, irradiating the laid reinforcement fiber band, in regions, by the radiation source 10, detecting reflection radiation reflected by the laid reinforcement fiber band 2 by the radiation sensor 11 and evaluating the detected reflection radiation by the evaluation unit 12 in order to establish laying errors. It is self-evident that the individual steps of the method can be implemented any number of times and in different sequences.

In the detailed description above, various features have been summarised in one or more examples so as to provide a more cogent representation. However, it should be clear here that the above description is of a purely illustrative, but in no way limiting nature. The description serves to cover all alternatives, modifications and equivalents of the various features and embodiments. Many other examples will become immediately clear to a person skilled in the art owing to their expert knowledge in view of the above description.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fiber composite laying method for producing a fiber composite scrim for forming a fiber composite component, the method comprising:
   supplying a reinforcement fiber band to a laying head;
   laying and compacting the supplied reinforcement fiber band on a laying surface at an average compaction pressure by a compaction roller;
   detecting a local compaction pressure on the laid reinforcement fiber band by a plurality of pressure sensors on the compaction roller;
   irradiating the laid reinforcement fiber band, at least in regions, by a radiation source;
   detecting reflection radiation reflected by the laid reinforcement fiber band by a radiation sensor; and
   evaluating the detected reflection radiation by an evaluation unit to establish laying errors;

wherein at least some of the pressure sensors are transparent to radiation emitted by the radiation source.

2. The fiber composite laying method of claim 1, comprising adjusting the average compaction pressure of the compaction roller on a basis of the detected local compaction pressure.

3. The fiber composite laying method of claim 1, comprising adjusting the local compaction pressure by a plurality of actuators on the compaction roller on a basis of the detected local compaction pressure.

4. The fiber composite laying method of claim 1, wherein the compaction roller is, at least in regions, transparent to radiation emitted by the radiation source.

5. The fiber composite laying method of claim 1, wherein at least some of the pressure sensors are actuators.

6. The fiber composite laying method of claim 1, wherein the pressure sensors are configured as at least one sensor array along a compaction surface of the compaction roller.

7. The fiber composite laying method of claim 1, wherein the pressure sensors substantially cover an entire compaction surface of the compaction roller.

8. The fiber composite laying method of claim 1, wherein:
the pressure sensors comprise a pressure-sensitive flexible diaphragm; or
the pressure sensors are piezoelectric elements; or
the pressure sensors are embedded in a protective layer on the compaction roller.

9. A fiber composite laying method for producing a fiber composite scrim for forming a fiber composite component, the method comprising:
supplying a reinforcement fiber band to a laying head;
laying and compacting the supplied reinforcement fiber band on a laying surface at an average compaction pressure by a compaction roller;
detecting a local compaction pressure on the laid reinforcement fiber band by a plurality of pressure sensors on the compaction roller; and
irradiating the laid reinforcement fiber band, at least in regions, by a radiation source;
wherein at least some of the pressure sensors are transparent to radiation emitted by the radiation source.

10. The fiber composite laying method of claim 9, comprising adjusting the average compaction pressure of the compaction roller on a basis of the detected local compaction pressure.

11. The fiber composite laying method of claim 9, comprising adjusting the local compaction pressure by a plurality of actuators on the compaction roller on a basis of the detected local compaction pressure.

12. The fiber composite laying method of claim 9, wherein the compaction roller is, at least in regions, transparent to radiation emitted by the radiation source.

13. The fiber composite laying method of claim 9, wherein at least some of the pressure sensors are actuators.

14. The fiber composite laying method of claim 9, wherein the pressure sensors are configured as at least one sensor array along a compaction surface of the compaction roller.

15. The fiber composite laying method of claim 9, wherein the pressure sensors substantially cover an entire compaction surface of the compaction roller.

16. The fiber composite laying method of claim 9, wherein:
the pressure sensors comprise a pressure-sensitive flexible diaphragm; or
the pressure sensors are piezoelectric elements; or
the pressure sensors are embedded in a protective layer on the compaction roller.

* * * * *